United States Patent
You et al.

(10) Patent No.: US 10,379,585 B2
(45) Date of Patent: Aug. 13, 2019

(54) SEMICONDUCTOR DEVICE MANAGING POWER BUDGET AND OPERATING METHOD THEREOF

(71) Applicants: SK Hynix Inc., Icheon (KR); Industry-Academic Cooperation Foundation Yonsei University, Seoul (KR)

(72) Inventors: Taehee You, Incheon (KR); Sangwoo Han, Seoul (KR); Youngmin Park, Seoul (KR); Eui-Young Chung, Daejeon (KR); Jaewoo Park, Suwon (KR); Byungryul Kim, Icheon (KR); Younghwan Hong, Icheon (KR)

(73) Assignee: SK HYNIX INC., Icheon (KR)

(*) Notice: Subject to any disclaimer, the term of this patent is extended or adjusted under 35 U.S.C. 154(b) by 206 days.

(21) Appl. No.: 15/453,224

(22) Filed: Mar. 8, 2017

(65) Prior Publication Data

US 2017/0277243 A1    Sep. 28, 2017

(30) Foreign Application Priority Data

Mar. 24, 2016    (KR) .................. 10-2016-0035589

(51) Int. Cl.
| | | |
|---|---|---|
| *G06F 1/26* | (2006.01) | |
| *H04L 9/32* | (2006.01) | |
| *G06F 1/3228* | (2019.01) | |
| *G06F 1/3234* | (2019.01) | |

(52) U.S. Cl.
CPC .............. *G06F 1/26* (2013.01); *G06F 1/3228* (2013.01); *G06F 1/3243* (2013.01); *H04L 9/3234* (2013.01); *G06F 2221/2147* (2013.01); *Y02D 10/152* (2018.01)

(58) Field of Classification Search
CPC ....... G11C 5/14; H04L 12/4637; H04L 12/56; G06F 13/4068; G06F 1/26
See application file for complete search history.

(56) References Cited

U.S. PATENT DOCUMENTS

| | | | |
|---|---|---|---|
| 7,930,578 B2 | 4/2011 | Bose et al. | |
| 2008/0263373 A1* | 10/2008 | Meier | G06F 1/3203 713/300 |
| 2014/0010033 A1* | 1/2014 | Won | G11C 7/22 365/227 |

(Continued)

FOREIGN PATENT DOCUMENTS

KR    10-2014-0006344 A    1/2014

*Primary Examiner* — Ajay Ojha (57) ABSTRACT

A semiconductor device may comprise a plurality of chips coupled in a bidirectional ring structure. The plurality of chips includes a first chip, and the first chip determines whether a token is required to perform a specific operation in the first chip. The first chip further determines whether an amount of an available token in the first chip is equal to or greater than an amount of the required token to perform the specific operation. When the amount of the available token is equal to or greater than the amount of the required token, the first chip performs the specific operation and then the first chip outputs one or both of a first portion of the available token in a first direction and a second portion of the available token in a second direction. The first direction is opposite to the second direction in the bidirectional ring structure.

20 Claims, 6 Drawing Sheets

(56) References Cited

U.S. PATENT DOCUMENTS

| | | |
|---|---|---|
| 2014/0047200 A1 | 2/2014 | Isachar et al. |
| 2014/0143558 A1* | 5/2014 | Kuesel .................... G06F 1/26 713/300 |

* cited by examiner

SEMICONDUCTOR DEVICE MANAGING POWER BUDGET AND OPERATING METHOD THEREOF

CROSS-REFERENCE TO RELATED APPLICATION

The present application claims priority to Korean Patent Application No. 10-2016-0035589, filed on Mar. 24, 2016, which is incorporated herein by reference in its entirety.

BACKGROUND

1. Field

Embodiments of the present disclosure relate to a semiconductor device for performing power management and a method of operating the same, and more particularly, to a semiconductor device for performing power management based on one or more tokens and an operation method thereof.

2. Description of the Related Art

During an operation of a semiconductor device, there may occur a period in which a peak instantaneous current flows in the semiconductor device, thereby consuming more power than the average power consumed by the semiconductor device.

A section corresponding to the period is called a peak zone (PKZ) and the operation including this section is called a peak zone operation.

When the semiconductor device includes a plurality of chips and the plurality of chips simultaneously perform respective peak zone operations, a failure may occur in the semiconductor device due to excessive current consumption.

In order to substantially prevent such a failure, a power management technique using a token has been used in a conventional semiconductor device. Specifically, such a conventional semiconductor device includes a plurality of chips having a unidirectional ring structure.

A chip in the conventional semiconductor device having the unidirectional ring structure waits until a sufficient amount of token is collected by the chip to perform a peak zone operation. As used in this disclosure, the term 'token' indicates authorization to perform a specific operation. For example, when a chip receives a token and an amount of the received token is equal to or greater than a threshold value, the chip can perform the specific operation. However, one of skilled in the art will understand that such references are merely for convenience of description and are not intended to limiting. Specifically, the term 'an amount of token' can be used interchangeably with another term 'a number of tokens.' For example, the amount of token equal to 70 can correspond to the number of tokens equal to 70.

Accordingly, when the conventional semiconductor device further includes a next chip operating subsequent to the chip, the next chip cannot perform a corresponding peak zone operation and is in a standby state, even if there is a sufficient amount of token to perform the corresponding peak zone operation in the next chip. As a result, the operation performance of the conventional semiconductor device is deteriorated.

SUMMARY

Various embodiments are directed to a semiconductor device and an operation method thereof, capable of improving operation performance and optimizing consumption of a peak current.

In an embodiment, a semiconductor device may comprise a plurality of chips coupled in a bidirectional ring structure, the plurality of chips including a first chip. The first chip determines whether token is required to perform a specific operation in the first chip, and the first chip further determines whether an amount of available token in the first chip is equal to or greater than an amount of the required token to perform the specific operation when the first chip has determined that the specific operation requires the token. When the amount of the available token is equal to or greater than the amount of the required token, the first chip performs the specific operation and then the first chip performs one or both of outputting a first portion of the available token in a first direction and outputting a second portion of the available token in a second direction, the first direction being opposite to the second direction in the bidirectional ring structure.

In an embodiment, an operating method of a semiconductor device, which comprises a plurality of chips including a first chip, a second chip, and a third chip coupled in a bidirectional ring structure, may comprise determining, by the first chip, whether a specific operation performed in the first chip requires token; comparing, by the first chip, an amount of available token in the first chip with an amount of the required token to perform the specific operation when it is determined that the specific operation requires the token; performing, by the first chip, the specific operation when the amount of the available token is equal to or greater than the amount of the required token; and performing, by the first chip, one or both of outputting a first portion of the available token to the second chip and outputting a second portion of the available token to the third chip after performing the specific operation. The second chip is next to the first chip in a first direction and the third chip is next to the first chip in a second direction, the first direction being opposite to the second direction in the bidirectional ring structure.

DETAILED DESCRIPTION

Hereafter, various embodiments will be described below in more detail with reference to the accompanying drawings.

Figure 1:
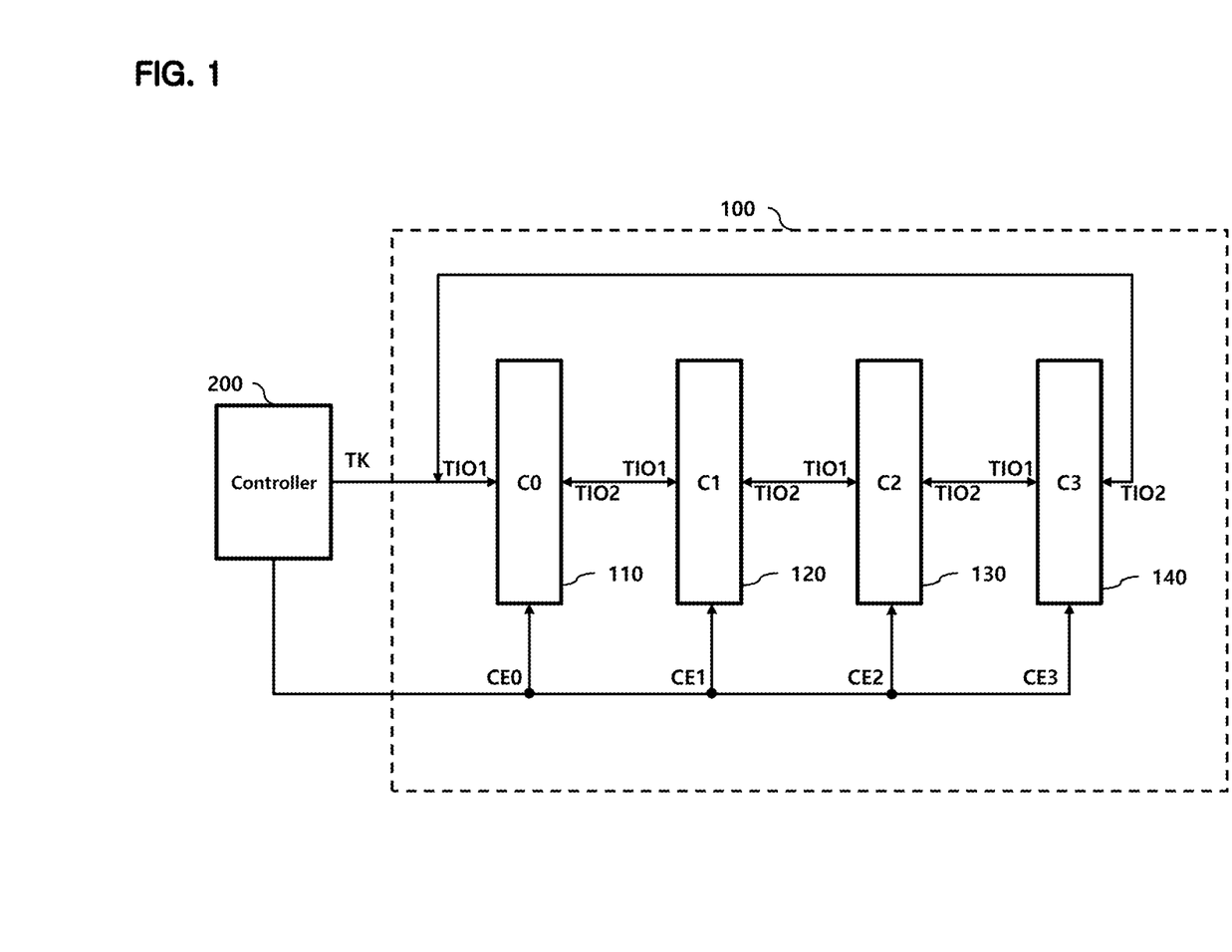
FIG. 1 is a block diagram of a semiconductor device according to an embodiment.

FIG. 1 is a block diagram of a semiconductor device 100 according to an embodiment.

The semiconductor device 100 includes a plurality of chips 110 to 140. Although the semiconductor device 100 according to the embodiment shown in FIG. 1 includes four chips 110, 120, 130, and 140, a semiconductor device according to other embodiments may include a different number of chips.

In a first direction (e.g., a counterclockwise direction of FIG. 1), each of the plurality of chips 110 to 140 receives input token on a first port TIO1 and outputs output token through a second port TIO2 for power management. In a second direction (e.g., a clockwise direction of FIG. 1) opposite to the first direction, each of the plurality of chips 110 to 140 receives input token on the second port TIO2 and outputs output token through the first port TIO1.

The embodiment shown in FIG. 1 further includes a controller 200. The controller 200 can provide token TK to the first chip 110 as the input token of the first chip 110 at the beginning of a process associated with token management.

The controller 200 may further provide first to fourth chip enable signals CE0 to CE3 to the first chip 110 to the fourth chip 140, respectively.

In each of the chips 110 to 140 in the embodiment of FIG. 1, each of the first and second ports TIO1 and TIO2 receives or outputs token according to the first or second direction along which the input token and the output token are provided, respectively, and thus functions as an input port as well as an output port. However, embodiments of the present disclosure are not limited thereto. For example, FIG. 2 illustrates another embodiment in which input token signals are received through two different input ports of each of a plurality of chips 110-1 to 140-1 according to the first and second directions and output token signals are output through two different output ports of each of the plurality of chips 110-1 to 140-1 according to the first and second directions, which will be described below in more detail.

Figure 2:
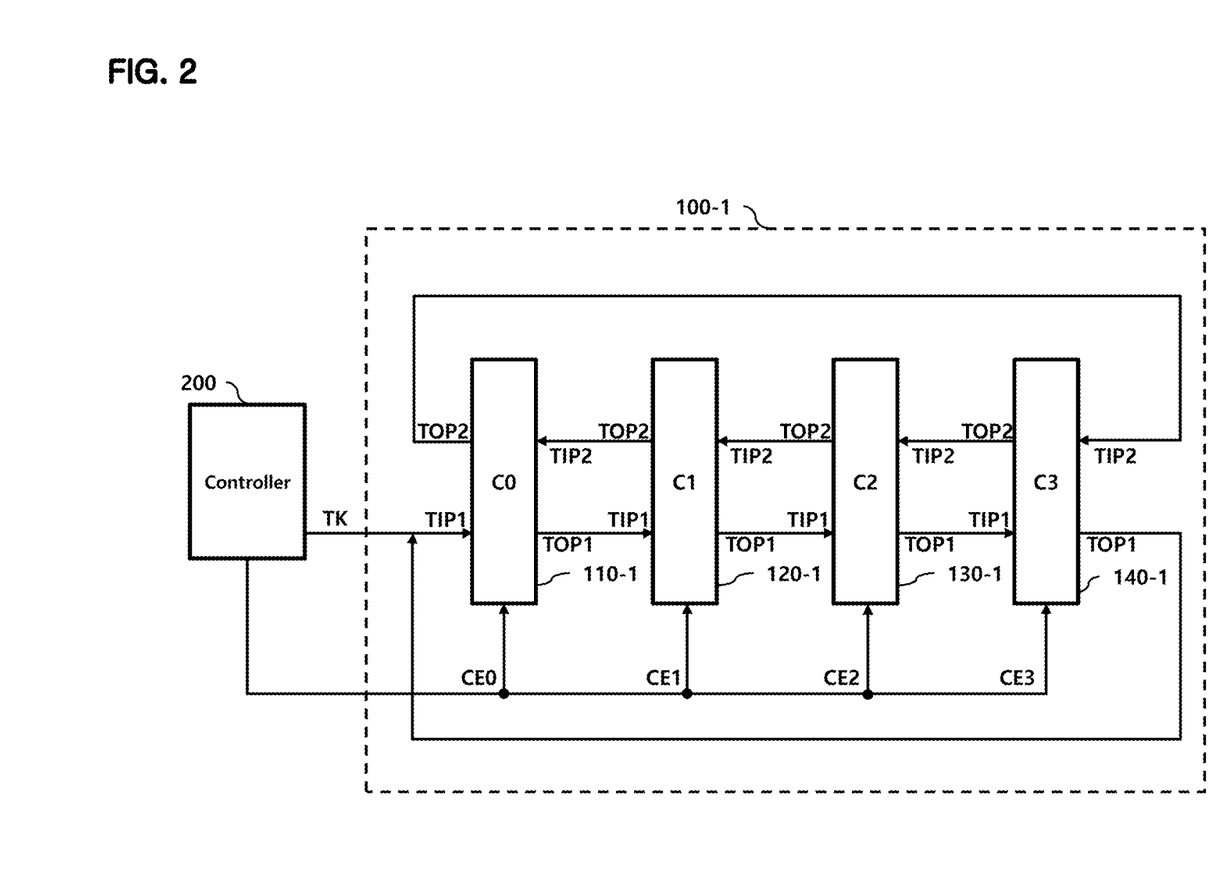
FIG. 2 is a block diagram of a semiconductor device according to another embodiment.

In the embodiment of FIG. 2, each (e.g., a second chip C1) of the plurality of chips 110-1 to 140-1 includes a first input port TIP1 for receiving token from a left-side chip (e.g., a first chip C0), a first output port TOP1 for outputting token to a right-side chip (e.g., a third chip C2), a second input port TIP2 for receiving token from the right-side chip, a second output port TOP2 for outputting token to the left-side chip. The left-side chip and the right-side chip are determined with respect to the orientation of FIG. 2.

In FIG. 2, each of the plurality of chips 110-1 to 140-1 receives token on the second and first input ports TIP2 and TIP1 from the right-side and left-side chips, respectively, and outputs token through the first and second output ports TOP1 and TOP2 to the right-side and left-side chips, respectively.

In FIG. 2, the token circulates in a first direction, e.g., in the order of the first chip 110-1, the second chip 120-1, the third chip 130-1, the fourth chip 140-1, the first chip 110-1, as well as in a second direction, e.g., in the order of the fourth chip 140-1, the third chip 130-1, the second chip 120-1, the first chip 110-1, and the fourth chip 140-1), the second direction being opposite to the first direction.

In the embodiment shown in FIG. 1 or FIG. 2, each of the plurality of chips 110 to 140 or 110-1 to 140-1 manages available token by dividing an amount of the available token into an amount of first direction available token and an amount of second direction available token.

In an initial operation, the controller 200 provides token TK to the first chip 110-1, and the first chip 110-1 may divide the amount of the token TK equally into the amount of the first direction available token and the amount of the second direction available token.

In another embodiment, a ratio of the amount of the first direction available token to the amount of the second direction available token may be different from one to one (i.e., 1:1).

In the embodiment shown in FIG. 1 or FIG. 2, each of the plurality of chips 110 to 140 or 110-1 to 140-1 manages token allocated to perform a specific operation (e.g., a peak zone operation), the allocated token being referred as a usage token, by dividing an amount of the usage token into a first amount of first direction usage token and a second amount of second direction usage token.

In the embodiment shown in FIG. 1 or FIG. 2, each of the plurality of chips 110 to 140 or 110-1 to 140-1 manages the remaining token, which is obtained by subtracting the amount of the usage token from an amount of available token, by dividing an amount of the remaining token into an amount of first direction remaining token and an amount of second direction remaining token.

A process of operating the semiconductor device 100 of FIG. 1 or the semiconductor device 100-1 of FIG. 2 according to an embodiment will be described below with reference to FIGS. 3 to 5.

Figure 3:
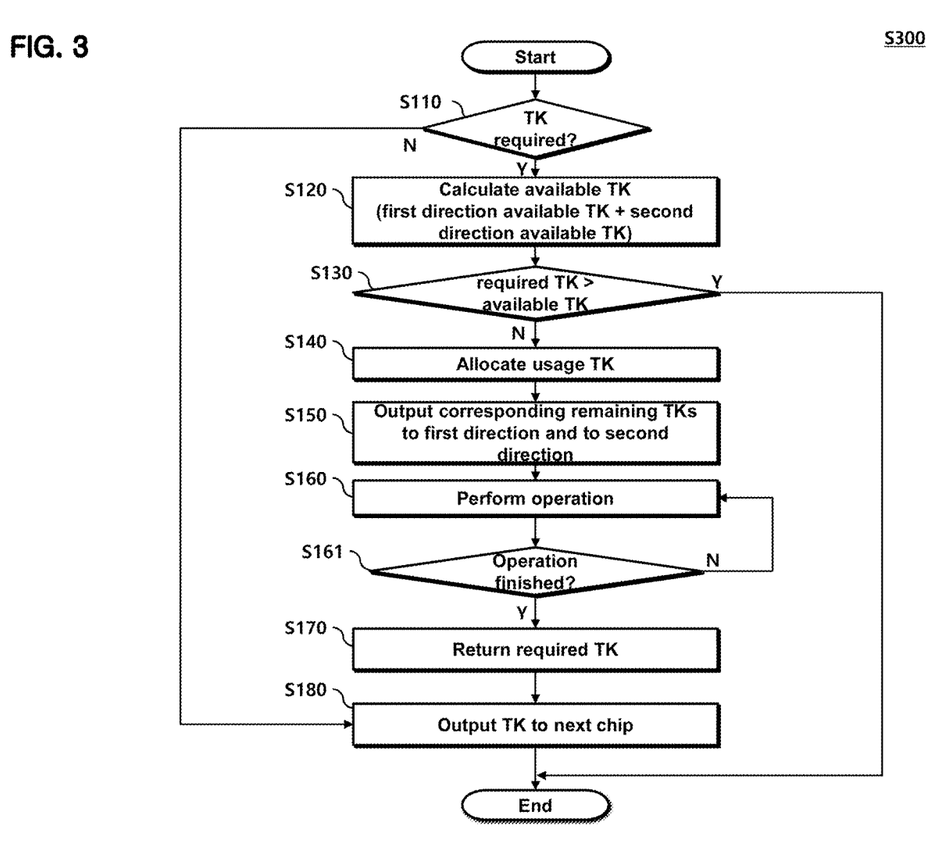
FIG. 3 is a flowchart illustrating operations of a semiconductor device according to an embodiment.

FIG. 3 is a flowchart illustrating a token management process S300 of any one (or a current chip) of the chips included in the semiconductor device 100 of FIG. 1 or the semiconductor device 100-1 of FIG. 2, according to an embodiment.

In an embodiment, such a flowchart illustrates a token management process (e.g., the process S300 of FIG. 3) during a unit cycle in which power control is performed, and the process of the flowchart may be repeated for a number of unit cycles. In an embodiment, the current chip performs the process S300 as will be described below in more detail.

At S110, it is determined whether a specific operation to be performed by the current chip requires token. For example, a peak zone operation requires token.

If it is determined that the specific operation of the current chip does not require token at S110, the current chip outputs available token to one or more of next chips at S180, and then the current chip ends the token management process S300. In an embodiment, the available token at S180 corresponds to holding token held in the current chip.

When the current chip (e.g., the second chip 120-1 of FIG. 2) outputs the available token at S180, the current chip outputs first direction available token to a first next chip (e.g., the third chip 130-1 of FIG. 2) in a first direction (or a first sequence), and outputs second direction available token to a second next chip (e.g., the first chip 110-1 of FIG. 2) in a second direction (or a second sequence).

If it is determined that the specific operation of the current chip requires token at S110, an amount of the available token in the current chip is calculated at S120. The amount of the available token in the current chip can be calculated as the sum of an amount of the first direction available token and an amount of the second direction available token in the current chip.

Then, at S130, it is determined whether an amount of the required token to perform the specific operation of the current chip is greater than the amount of the available token in the current chip.

If it is determined that the amount of the required token is greater than the amount of the available token in the current chip, the current chip does not perform the specific operation. As a result, the current chip waits until the amount of the available token becomes greater than the amount of the required token.

If it is determined that the amount of the required token in the current chip is not greater than the amount of the available token at S130, a first amount of first direction usage token and a second amount of second direction usage token) are allocated from the amount of the available token at S140. In an embodiment, the first amount of the first direction usage token and the second amount of the second direction usage token are determined based on the amount of the first direction available token, the amount of the second direction available token, and the amount of the required token. For example, when the first amount of the first direction usage token is equal to or less than the amount of the first direction available token and the second amount of the second direction usage token is equal to or less than the amount of the second direction available token, the sum of the first amount of the first direction usage token and the second amount of the second direction usage token is equal to the amount of the required token.

An operation of determining and allocating the first direction usage token and the second direction usage token at S140 in the embodiment shown in FIG. 3 will be described below in more detail with reference to a flowchart of FIG. 4.

At S141, divided token is set as token having an amount equal to one half of the amount of the required token in the current chip.

Next, at S142, it is determined whether the amount of the first direction available token of the current chip is equal to or greater than the amount of the divided token, and if so, at S143, it is determined whether the amount of the second direction available token of the current chip is equal to or greater than the divided token.

If both of the amount of the first direction available token and the amount of the second direction available token are equal to or greater than the amount of the divided token, each of the first amount of the first direction usage token and the second amount of the second direction usage token are determined to be equal to the amount of the divided token, and the first amount of the first direction usage token and the second amount of the second direction usage token are allocated from the amount of the first direction available token and the amount of the second direction available token, respectively, at S144.

On the other hand, if it is determined that the amount of the first direction available token is less than the amount of the divided token at S142, the amount of the first direction available token is allocated as the first amount of the first direction usage token. In addition, the remaining amount of the required token, which is obtained by subtracting the first amount of the first direction usage token from the amount of the required token, is determined as the second amount of the second direction usage token, and the second amount of the second direction usage token is allocated from the amount of the second direction available token, at S145.

When it is determined that the amount of the second direction available token is less than the amount of the divided token at S143, the amount of the second direction available token is allocated as the second amount of the second direction usage token. In addition, the remaining amount of the required token, which is obtained by subtracting the second amount of the second direction usage token from the amount of the required token, is determined as the first amount of the first direction usage token, and the first amount of the first direction usage token is allocated from the amount of the first direction available token, at S146.

Figure 4:
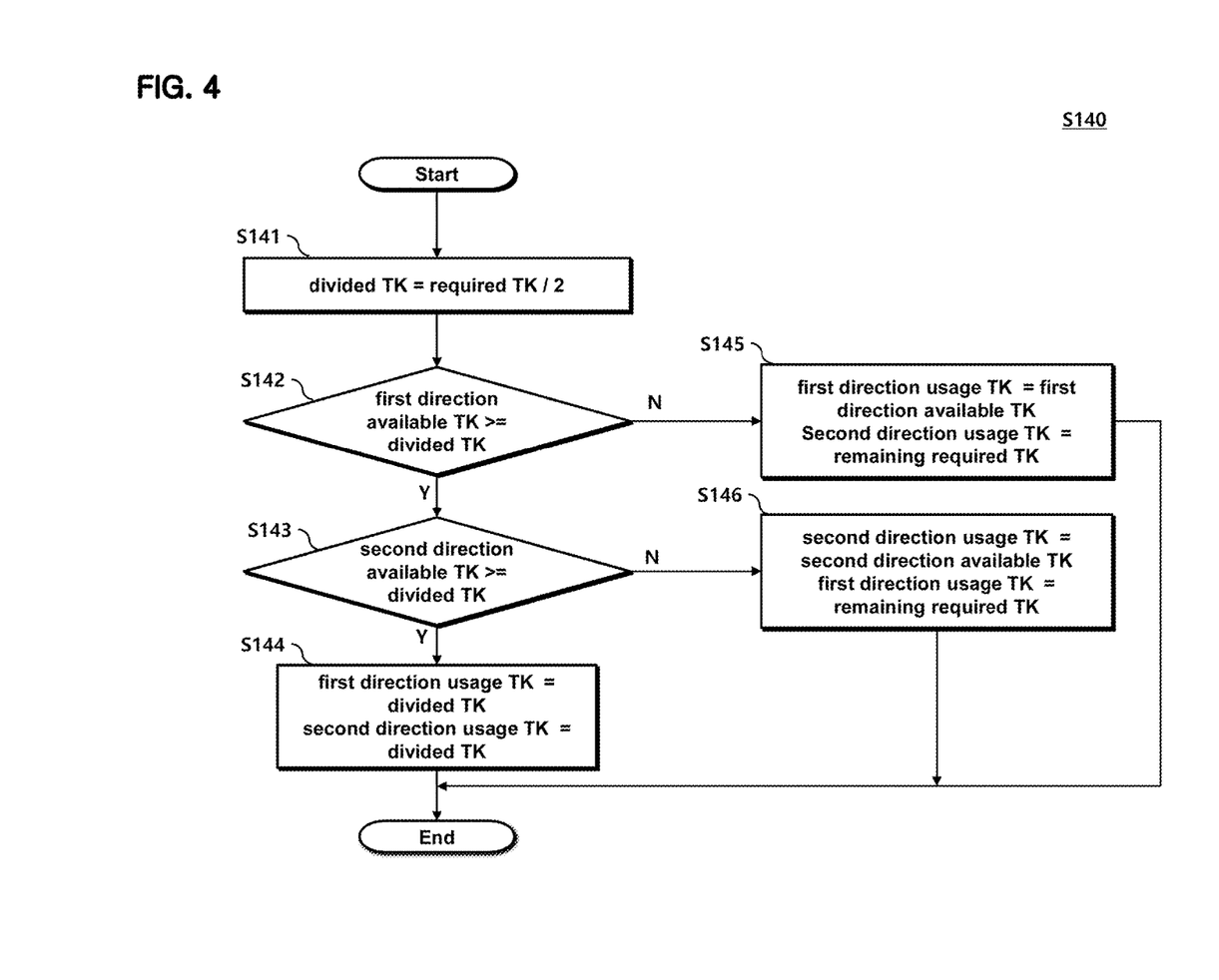
FIG. 4 is a flowchart illustrating a token allocation operation of FIG. 3.

The process S140 according to the embodiment shown in FIG. 4 shows an example of allocating the first amount of the first direction usage token and the second amount of the second direction usage token based on the amount of the divided token, which is equal to a half of the amount of the required token. However, embodiments of the present disclosure are not limited thereto, and the method of determining the first amount of the first direction usage token and the second amount of the second direction usage token may vary according to other embodiments.

Thereafter, referring back to FIG. 3, the current chip transfers first direction remaining token having an amount, which is obtained by subtracting the first amount of the first direction usage token from the amount of the first direction available token, to the first next chip in the first direction at S150. The current chip also transfers second direction remaining token having an amount, which is obtained by subtracting the second amount of the second direction usage token from the amount of the second direction available token, to the second next chip in the second direction at S150.

Thereafter, the specific operation is performed in the current chip at S160. At S161, it is determined whether the specific operation is complete. When it is determined that the operation has not been completed, the specific operation is performed again at S160.

When it is determined that the operation has been completed, the amount of the required token to perform the specific operation is returned at S170.

Returning the required token at S170 may include setting the first amount of the first direction usage token as the amount of the first direction available token in the current chip and setting the second amount of the second direction usage token as the amount of the second direction available token in the current chip. For example, after returning the required token is performed at S170, the amount of the first direction available token in the current chip becomes equal to the first amount of the first direction usage token, and the amount of the second direction available token in the current chip becomes equal to the second amount of the second direction usage token.

At S180, the available token is output to the one or more of next chips. For example, outputting of the available token may include outputting the first direction available token to the first next chip in the first direction and outputting the second direction available token to the second next chip in the second direction. In an embodiment, the available token at S180 corresponds to holding token held in the current chip.

Figure 5:
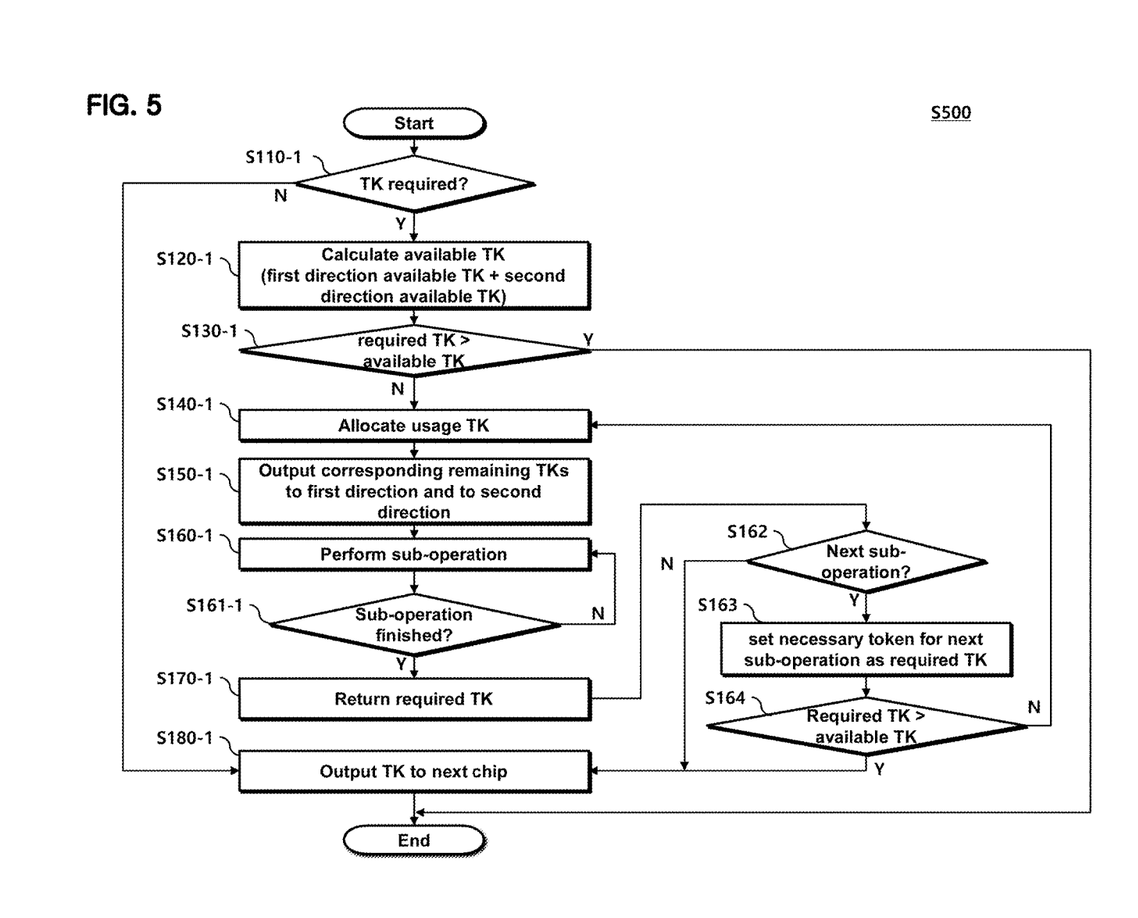
FIG. 5 is a flowchart illustrating operations of a semiconductor device according to an embodiment.

FIG. 5 is a flowchart illustrating a token management process S500 of a chip (or a current chip) included in the semiconductor device 100 of FIG. 1 or the semiconductor device 100-1 of FIG. 2 according to an embodiment. The token management process S500 shown in FIG. 5 differs from the token management process S300 of FIG. 3 in that an amount of token is controlled by the sub-operation unit and an operation requiring token includes a plurality of sub-operations.

In an embodiment, such a flowchart illustrates a token management process (e.g., the process S500 of FIG. 5) during a unit cycle in which power control is performed, and the process of the flowchart of FIG. 5 may be repeated for a number of unit cycles.

At S110-1, it is determined whether a specific operation to be performed by the current chip requires token. For example, a peak zone operation requires token.

If it is determined that the specific operation of the current chip does not require token, the current chip outputs available token to one or more of next chips at S180-1.

When the current chip outputs the available token at S180-1, the current chip outputs first direction available token to a first next chip in a first direction (or a first sequence) and second direction available token to a second next chip in a second direction (or a second sequence).

If it is determined that the specific operation of the current chip requires the token at S110-1, an amount of the available token in the current chip is calculated at S120-1. The amount of the available token of the current chip can be calculated as the sum of an amount of the first direction available token and an amount of the second direction available token.

Then, at S130-1, it is determined whether an amount of the required token to perform the specific operation of the current chip is greater than the amount of the available token in the current chip.

The amount of the required token determined at S130-1 may represent an amount of token required to perform a first sub-operation included in the specific operation to be performed in the current chip.

If the amount of the required token is greater than the amount of the available token in the current chip, the current chip does not perform the specific operation. Subsequently, the current chip waits until the amount of the available token becomes greater than the amount of the required token to perform the first sub-operation.

If the amount of the required token in the current chip is not greater than the amount of the available token, a first amount of first direction usage token and a second amount of second direction usage token are allocated at S140-1. In an embodiment, the first amount of the first direction usage token and the second amount of the second direction usage token are determined based on the amount of the first direction available token, the amount of the second direction available token, and the amount of the required token. For example, when the first amount of the first direction usage token is equal to or less than the amount of the first direction available token and the second amount of the second direction usage token is equal to or less than the amount of the second direction available token, the sum of the first amount of the first usage token and the second amount of the second direction usage token is equal to the amount of the required token.

An operation of allocating the first direction usage token and the second direction usage token at S140-1 in the embodiment shown in FIG. 5 has been described above with reference to FIG. 4, and thus a detailed description thereof will be omitted for the interest of brevity.

Thereafter, the current chip transfers first direction remaining token having an amount, which is obtained by subtracting the first amount of the first direction usage token from the amount of the first direction available token, to the first next chip in the first direction at S150-1. The current chip also transfers second direction remaining token having an amount, which is obtained by subtracting the second amount of the second direction usage token from the amount of the second direction available token, to the second next chip in the second direction at S150-1.

Subsequently, a sub-operation (e.g., the first sub-operation), which requires the amount of the required token in the current chip, is performed at steps S160-1. At S161-1, it is determined whether the sub-operation is complete. When it is determined that the sub-operation has not been completed, the sub-operation is performed again at S160-1.

When it is determined that the sub-operation has been completed, the amount of the required token that has been allocated to perform the sub-operation is returned at S170-1.

Returning the required token at S170-1 may include setting the first amount of the first direction usage token as the amount of the first direction available token in the current chip and setting the second amount of the second direction usage token as the amount of the second direction available token in the current chip. For example, after returning the required token is performed at S170-1, the amount of the first direction available token in the current chip becomes equal to the first amount of the first direction usage token, and the amount of the second direction available token in the current chip becomes equal to the second amount of the second direction usage token.

Then, it is determined whether a next sub-operation (e.g., a second sub-operation) to be performed in the current chip exists at step S162

If it is determined that the next sub-operation does not exist at S162, the process S500 proceeds to S180-1 and outputs the available token to one or more of next chips at S180-1. For example, outputting of the available token may include outputting the first direction available token to the first next chip in the first direction and outputting the second direction available token to the second next chip in the second direction.

If it is determined that the next sub-operation exists at S162, required token is set to have an amount sufficiently large to perform the next sub-operation at S163. The token required to perform the next sub-operation will be referred to as 'second required token' hereinafter.

Thereafter, at S164, it is determined whether the amount of the second required token to perform the next sub-operation is greater than the amount of the available token in the current chip that has been determined at S170-1.

If the amount of the second required token is greater than the amount of the available token, the process S500 proceeds to S180-1.

If the amount of the second required token is not greater than the amount of the available token, the process S500 proceeds to S140-1 and repeats the above-described steps.

Figure 6:
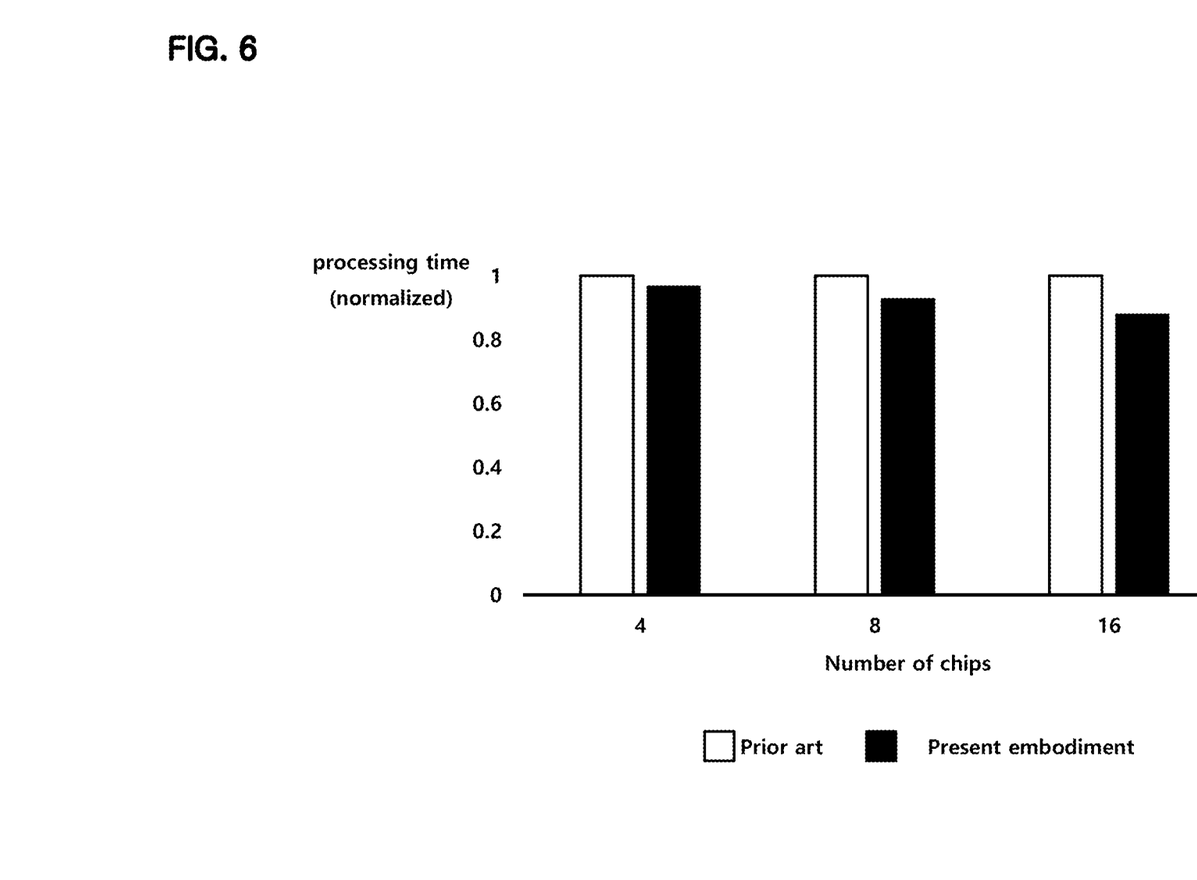
FIG. 6 is a graph illustrating processing times of a semiconductor device according to an embodiment and a conventional semiconductor device.

FIG. 6 is a graph illustrating improvements in performance of a semiconductor device (referred to as 'Present embodiment' in FIG. 6 and Table 1) according to an embodiment of the present disclosure, compared to performance of a conventional semiconductor device (referred to as 'Prior art' in FIG. 6 and Table 1). The graph of FIG. 6 indicates normalized processing times shown in the following Table 1. For example, a normalized processing time of the semiconductor device according to the embodiment is determined by dividing a processing time of the semiconductor device to execute a specific number of instructions by a processing time of the conventional semiconductor device to perform the instructions, the processing time of the conventional semiconductor device being set to '1' in Table 1 and FIG. 6.

TABLE 1

| Number of chips | Prior art (normalized) | Present embodiment (normalized) |
|---|---|---|
| 4 | 1 | 0.968 |
| 8 | 1 | 0.928 |
| 16 | 1 | 0.879 |

In FIG. 6, the vertical axis represents normalized times to process the specific number of instructions. The horizontal axis of FIG. 6 represents a number of chips included in each of a semiconductor device according to an embodiment and a conventional semiconductor device.

FIG. 6 and Table 1 show that the performance of the semiconductor device according to the embodiment was improved by reducing the processing times in all of the cases, compared to the conventional semiconductor device. In addition, FIG. 6 shows that the performance improvement increases as the number of chips increases.

Although various embodiments have been described for illustrative purposes, it will be apparent to those skilled in the art that various changes and modifications may be made without departing from the spirit and scope of the invention as defined in the following claims.

What is claimed is:

1. A semiconductor device comprising:
a plurality of chips coupled in a bidirectional ring structure, the plurality of chips including a first chip,
wherein the first chip determines whether token is required to perform a specific operation in the first chip, divides an amount of available token into an amount of first direction available token and an amount of second direction available token, and determines whether the amount of the available token in the first chip is equal to or greater than an amount of the required token to perform the specific operation when the first chip has determined that the specific operation requires the token, and
wherein, when the amount of the available token is equal to or greater than the amount of the required token, the first chip performs the specific operation and then the first chip performs one or both of outputting a first portion of the available token in a first direction and outputting a second portion of the available token in a second direction, the first direction being opposite to the second direction in the bidirectional ring structure.

2. The semiconductor device of claim 1, wherein the plurality of chips further includes a second chip and a third chip, the second chip being next to the first chip in the first direction, the third chip being next to the first chip in the second direction, and
wherein the first chip includes a first port receiving or outputting token between the first chip and the second chip and a second port receiving or outputting token between the first chip and the third chip.

3. The semiconductor device of claim 1, wherein the plurality of chips further includes a second chip and a third chip, the second chip being next to the first chip in the first direction, the third chip being next to the first chip in the second direction, and
wherein the first chip includes a first output port outputting token to the second chip, a first input port receiving token from the second chip, a second output port outputting token to the third chip, and a second input port receiving token from the third chip.

4. The semiconductor device of claim 1, wherein the amount of the available token is equal to a sum of the amount of the first direction available token and the amount of the second direction available token.

5. The semiconductor device of claim 4, wherein the plurality of chips further includes a second chip and a third chip, the second chip being next to the first chip in the first direction, the third chip being next to the first chip in the second direction, and
wherein the first chip outputs the first direction available token to the second chip and outputs the second direction available token to the third chip without performing the specific operation when the current chip has determined that the specific operation does not require the token.

6. The semiconductor device of claim 4, wherein the first chip allocates a portion of the amount of the first direction available token to a first amount of a first direction usage token and allocates a portion of the amount of the second direction available token to a second amount of a second direction usage token when the amount of the available token is equal to or greater than the amount of the required token,
wherein a sum of the first amount of the first direction usage token and the second amount of the second direction usage token is equal to the amount of the required token, and
wherein the first chip outputs the first direction available token to a second chip next to the first chip in the first direction and outputs the second direction available token to a third chip next to the first chip in the second direction without performing the specific operation when the first chip has determined that the specific operation does not require the token.

7. The semiconductor device of claim 6, wherein the first amount of the first direction usage token is equal to or less than a half of the amount of the required token, and the second amount of the second direction usage token is equal to or less than the half of the amount of the required token.

8. The semiconductor device of claim 6, wherein the first chip outputs first remaining token to the second chip in the first direction, the first remaining token having an amount obtained by subtracting the first amount of the first direction usage token from the amount of the first direction available token, and the first chip outputs second remaining token to the third chip in the second direction, the second remaining token having an amount obtained by subtracting the second amount of the second direction usage token from the amount of the second direction available token before performing the specific operation.

9. A semiconductor device comprising:
a plurality of chips coupled in a bidirectional ring structure, the plurality of chips including a first chip,
wherein the first chip determines whether token is required to perform a specific operation in the first chip, and the first chip further determines whether an amount of available token in the first chip is equal to or greater than an amount of the required token to perform the specific operation when the first chip has determined that the specific operation requires the token,
wherein, when the amount of the available token is equal to or greater than the amount of the required token, the first chip performs the specific operation and then the first chip performs one or both of outputting a first portion of the available token in a first direction and outputting a second portion of the available token in a second direction, the first direction being opposite to the second direction in the bidirectional ring structure,
wherein the specific operation requiring the token includes a plurality of sub-operations, the plurality of sub-operations including a first sub-operation and a second sub-operation, and
wherein the first chip performs the first sub-operation when the amount of the available token in the first chip is equal to or greater than an amount of token required to perform the first sub-operation.

10. The semiconductor device of claim 9, wherein the amount of the available token in the first chip is an amount of first available token, the amount of the token required to perform the first sub-operation is an amount of first required token, and
wherein the first chip performs the second sub-operation when an amount of second available token determined after performing the first sub-operation is equal to or greater than an amount of second required token to perform the second sub-operation.

11. An operating method of a semiconductor device, the semiconductor device comprising a plurality of chips including a first chip, a second chip, and a third chip coupled in a bidirectional ring structure, the method comprising:
- determining, by the first chip, whether a specific operation performed in the first chip requires token;
- dividing, by the first chip, an amount of available token into an amount of first direction available token and an amount of second direction available token;
- comparing, by the first chip, the amount of the available token in the first chip with an amount of the required token to perform the specific operation when it is determined that the specific operation requires the token;
- performing, by the first chip, the specific operation when the amount of the available token is equal to or greater than the amount of the required token; and
- performing, by the first chip, one or both of outputting a first portion of holding token held by the first chip to the second chip and outputting a second portion of the holding token to the third chip after performing the specific operation,
- wherein the second chip is next to the first chip in a first direction and the third chip is next to the first chip in a second direction, the first direction being opposite to the second direction in the bidirectional ring structure.

12. The operating method of claim 11, further comprising waiting, by the first chip, until the amount of the available token becomes equal to or greater than the amount of the required token without performing the specific operation when the amount of the required token is greater than the amount of the available token.

13. The operating method of claim 11, wherein performing the specific operation comprises:
- allocating an amount of usage token based on the amount of the available token, the amount of the usage token corresponding to the amount of the required token; and
- performing the specific operation using the allocated usage token, and
- wherein an amount of the holding token held by the first chip is equal to an amount of the usage token.

14. The operating method of claim 13, wherein the amount of the available token is equal to a sum of the amount of the first direction available token and the amount of the second direction available token,
- wherein the usage token comprises first direction usage token and second direction usage token, and
- wherein allocating the amount of the usage token includes determining a first amount of the first direction usage token with a portion of the amount of the first direction available token and determining a second amount of the second direction usage token with a portion of the amount of the second direction available token.

15. The operating method of claim 14, wherein performing the one or both of outputting the first portion of the holding token and outputting the second portion of the holding token comprises outputting the first direction usage token to the second chip and outputting the second direction usage token to the third chip.

16. The operating method of claim 15, wherein the first amount of the first direction usage token is equal to or less than a half of the amount of the required token, and the second amount of the second direction usage token is equal to or less than the half of the amount of the required token.

17. The operating method of claim 14, further comprising:
- outputting, by the first chip, first direction remaining token to the second chip in the first direction before performing the specific operation, the first remaining token having an amount obtained by subtracting the first amount of the first direction usage token from the amount of the first direction available token; and
- outputting, by the first chip, second direction remaining token to the third chip in the second direction, the second remaining token having an amount obtained by subtracting the second amount of the second direction usage token from the amount of the second direction available token.

18. The operating method of claim 11, wherein the specific operation requiring the token includes a plurality of sub-operations, the plurality of sub-operations including a first sub-operation and a second sub-operation, the amount of the available token in the first chip being an amount of first available token, an amount of token required to perform the first sub-operation being an amount of first required token, and
- wherein performing the specific operation comprises:
- performing the first sub-operation using the amount of the first required token as an amount of first usage token;
- comparing an amount of second required token to perform the second sub-operation with an amount of second available token determined after performing the first sub-operation; and
- outputting the amount of the second available token to the second chip and the third chip when the amount of the second required token is greater than the amount of the second available token.

19. The operating method of claim 18, further comprising:
- allocating, by the first chip, an amount of second usage token based on the amount of the second available token when the amount of the second required token is equal to or less than the amount of the second available token; and
- performing the second sub-operation using the allocated second usage token.

20. The operating method of claim 19, further comprising:
- outputting, by the first chip, first remaining token to the second chip in the first direction, and outputting second remaining token to the third chip in the second direction before performing the second sub-operation,
- wherein the first remaining token has an amount obtained by subtracting a first amount of the second usage token from a first amount of the second available token, and the second remaining token has an amount obtained by subtracting a second amount of the second usage token from a second amount of the second available token, and
- wherein a sum of the first and second amounts of the second usage token corresponds to the amount of the second usage token, and a sum of the first and second amounts of the second available token corresponds to the amount of the second available token.

* * * * *